United States Patent [19]

Mizuno et al.

[11] Patent Number: 4,528,960
[45] Date of Patent: Jul. 16, 1985

[54] FUEL INJECTION MODE CONTROL FOR MULTI-CYLINDER INTERNAL COMBUSTION ENGINE

[75] Inventors: Toshiaki Mizuno, Nagoya; Norio Omori, Kariya; Masumi Kinugawa, Okazaki, all of Japan

[73] Assignee: Nippondenso Co., Ltd., Kariya, Japan

[21] Appl. No.: 514,247

[22] Filed: Jul. 15, 1983

[30] Foreign Application Priority Data

Jul. 22, 1982 [JP] Japan ............................... 57-128052

[51] Int. Cl.³ .................... F02D 13/06; F02D 5/00; F02M 51/00
[52] U.S. Cl. .................................... 123/478; 123/480; 123/490
[58] Field of Search ............... 123/478, 480, 490, 481, 123/493, 489; 364/424

[56] References Cited

U.S. PATENT DOCUMENTS

| | | | |
|---|---|---|---|
| 4,058,709 | 11/1977 | Long | 123/478 |
| 4,383,514 | 5/1983 | Fiala | 123/478 |
| 4,383,515 | 5/1983 | Higashiyama et al. | 123/478 |
| 4,387,429 | 6/1983 | Yamauchi et al. | 123/478 |
| 4,404,945 | 9/1983 | Fujikawa | 123/478 |
| 4,434,770 | 3/1984 | Nishimura et al. | 123/478 |

Primary Examiner—Raymond A. Nelli
Attorney, Agent, or Firm—Cushman, Darby & Cushman

[57] ABSTRACT

Fuel injection modes including an independent injection mode, group injection mode and simultaneous injection mode are changed over in accordance with an engine operating condition, for example, a load condition. The independent injection mode is selected when the engine is operating in a low load condition, and the fuel injection timing for each cylinder is controlled independently. When the low load condition of the engine changes to an intermediate load condition, the group injection mode is selected and the fuel injection timing is controlled for each group of cylinders formed by grouping the cylinders into at least two groups. The simultaneous injection mode is selected when the intermediate load condition changes to a high load condition, and the fuel injection timing for all the cylinders is controlled to be simultaneous.

4 Claims, 8 Drawing Figures

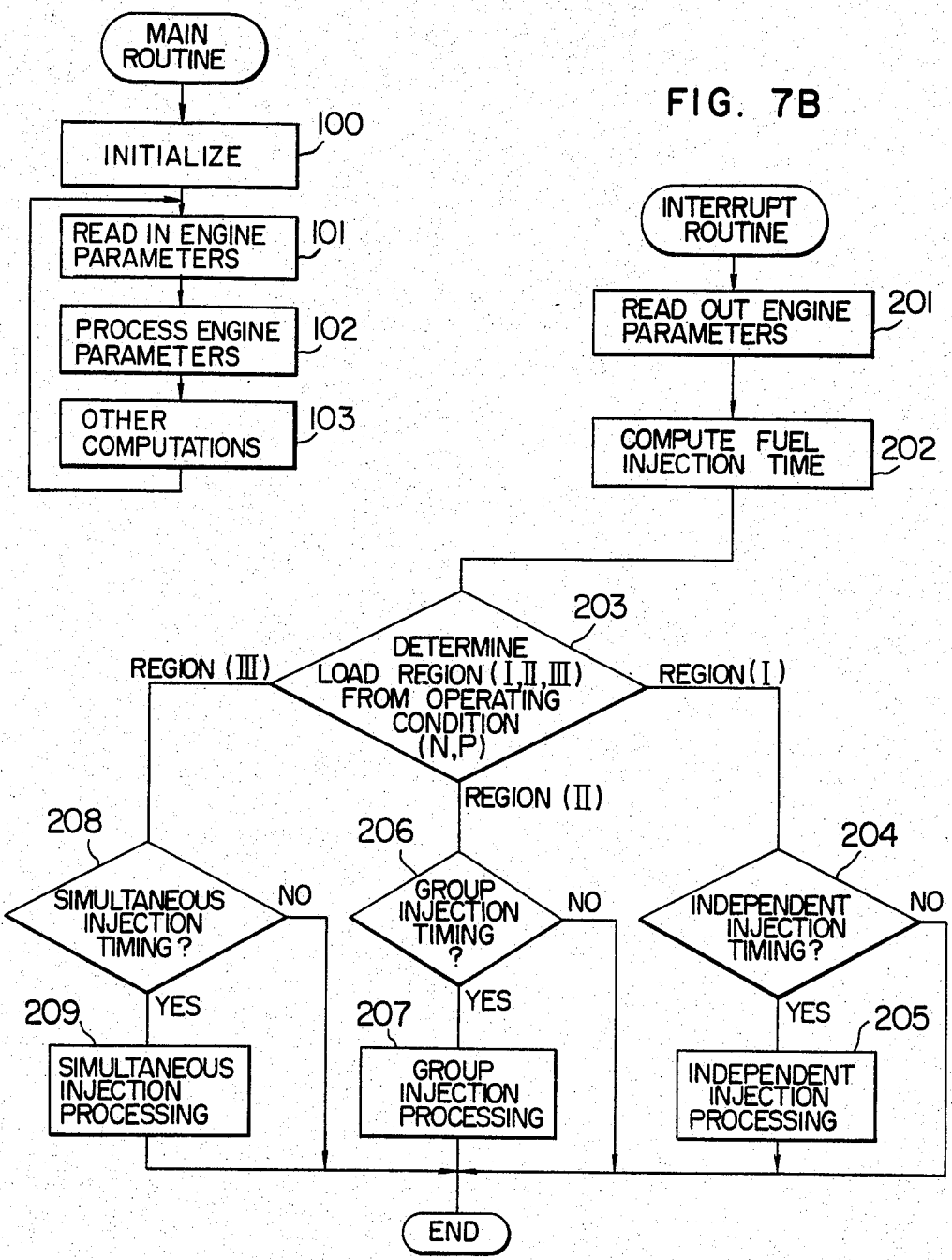

FUEL INJECTION MODE CONTROL FOR MULTI-CYLINDER INTERNAL COMBUSTION ENGINE

BACKGROUND OF THE INVENTION

1. Field of the Invention

This invention relates to a method and apparatus for controlling the fuel injection of an internal combustion engine and more particularly to a method and apparatus for changing over between different fuel injection modes in accordance with an engine operating condition.

2. Description of the Prior Art

With the conventional electronic fuel injection systems of the type including fuel injectors, a method has been used in which the injection timing of each cylinder is controlled independently from other cylinders to improve the acceleration response characteristic and to increase the degree of freedom of fuel metering at low engine speeds (this mode of injection is hereinafter referred to as an independent injection).

Also, Japanese Patent Publication No. 49-45652 (1974), for example, discloses a fuel injection control in which the independent injection mode is changed over to a simultaneous injection mode to inject the fuel to all cylinders simultaneously, since it is difficult at high engine speeds to control the fuel injection in the independent injection mode by the use of an inexpensive microcomputer having a low computing speed. However, the use of this change-over method always supplies the fuel excessively and insufficiently to some cylinders during each change-over period as shown in FIG. 1 so that the combustion is deteriorated and the drivability and exhaust emissions are affected adversely. This phenomenon will be explained with reference to FIG. 1.

FIG. 1 is a timing chart showing the times (b in the Figure) during which the intake valves open and the injection pulse signals (a, a' in the Figure) generated upon change-over from the independent injection mode to the per revolution simultaneous injection mode. If a change-over from the independent injection mode to the simultaneous injection mode and a change-over from the simultaneous injection mode to the independent mode are effected at crank angles 5/3 $\pi$ and 29/3 $\pi$, respectively, as shown in the Figure, the ratios of the fuel amounts drawn into the respective cylinders to the engine requirements become as shown in the Figure so that each of the Nos. 2, 4 and 1 cylinders has an excess or deficiency in fuel of about 50% and the engine will misfire during the three combustion periods. Indicated at c in the Figure are the ignition signals. If, for example, this control is effected by an inexpensive microcomputer having a low computing speed, there is a serious problem in that the times of change-over between the independent injection and the simultaneous injection are limited to the low engine speed range in view of the computing capability and the drivability and exhaust emissions are deteriorated.

SUMMARY OF THE INVENTION

With a view to overcoming the foregoing deficiencies in the prior art, it is the primary object of this invention to provide a method and apparatus for controlling the changing over of fuel injection modes in accordance with the operating conditions of an engine without causing adverse effects in the drivability and exhaust emission.

In accordance with this invention there is the effect of making it possible to effect a change-over from the independent injection to the group injection without any excess and deficiency of the fuel supply at the limit of the independent injection in the low speed range and also making it possible to effect a change-over from the group injection to the simultaneous injection at the limit of the group injection in the high speed range where the drivability and exhaust emissions present no problem. While the engine misfires on the latter change-over the duration of the misfiring is short due to the high speed and load operation and the drivability is no longer deteriorated by the misfiring. By using this control, it is possible to control the fuel injection with an improved response and without any deterioration of the drivability and exhaust emissions in the low speed range.

Note that the group injection mode is a method in which the cylinders are formed into at least two groups in accordance with the firing order and the fuel injection timing of the cylinders is controlled simultaneously group by group.

BRIEF DESCRIPTION OF THE DRAWINGS

FIGS. 7A and 7B are flow charts useful for explaining the operation of the invention.

DESCRIPTION OF THE PREFERRED EMBODIMENTS

Figure 1:
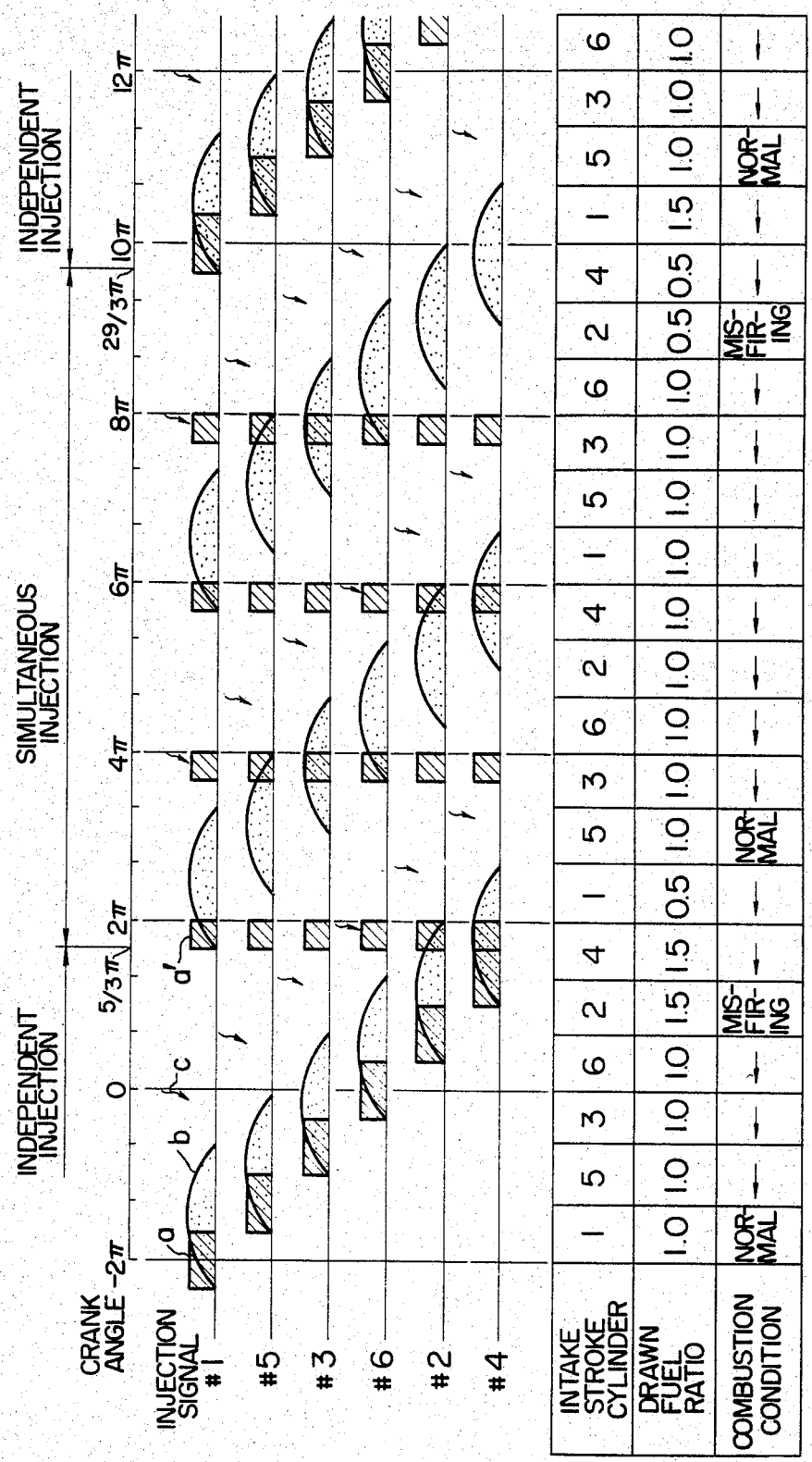
FIG. 1 is a timing diagram showing a conventional injection mode change-over.
Figure 2:
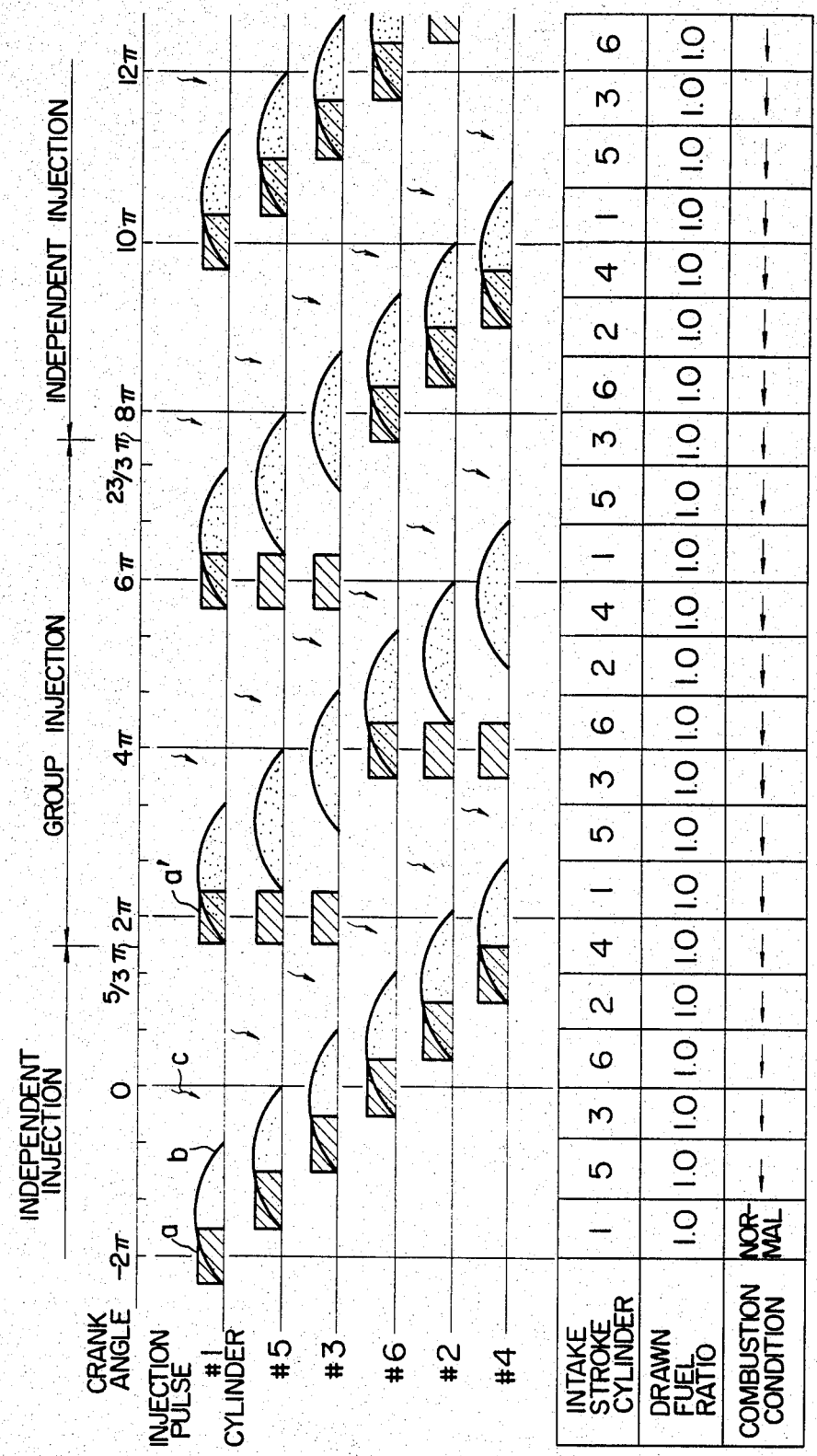
FIGS. 2 and 3 are timing diagrams showing an injection mode change-over according to the present invention.

FIG. 2 shows the manner in which the fuel is supplied during the change-over between the independent injection mode and the two-group injection mode of a six-cylinder engine. The change-over from the independent injection to the group injection is effected at a crank angle 5/3 $\pi$ and the change-over from the group injection to the independent injection is effected at a crank angle 23/3 $\pi$. The injection signals a for the independent injection and the group injection are generated at the rate of one for every interval between the two successive opening operations of each intake valve (the injection is effected once every two revolutions of the crankshaft for each cylinder) so that only the injection timing is shifted and the fuel drawn into each cylinder is neither more nor less than is needed, or fully sufficient. Thus, the previously mentioned effects on the drivability, etc., are eliminated.

Figure 3:
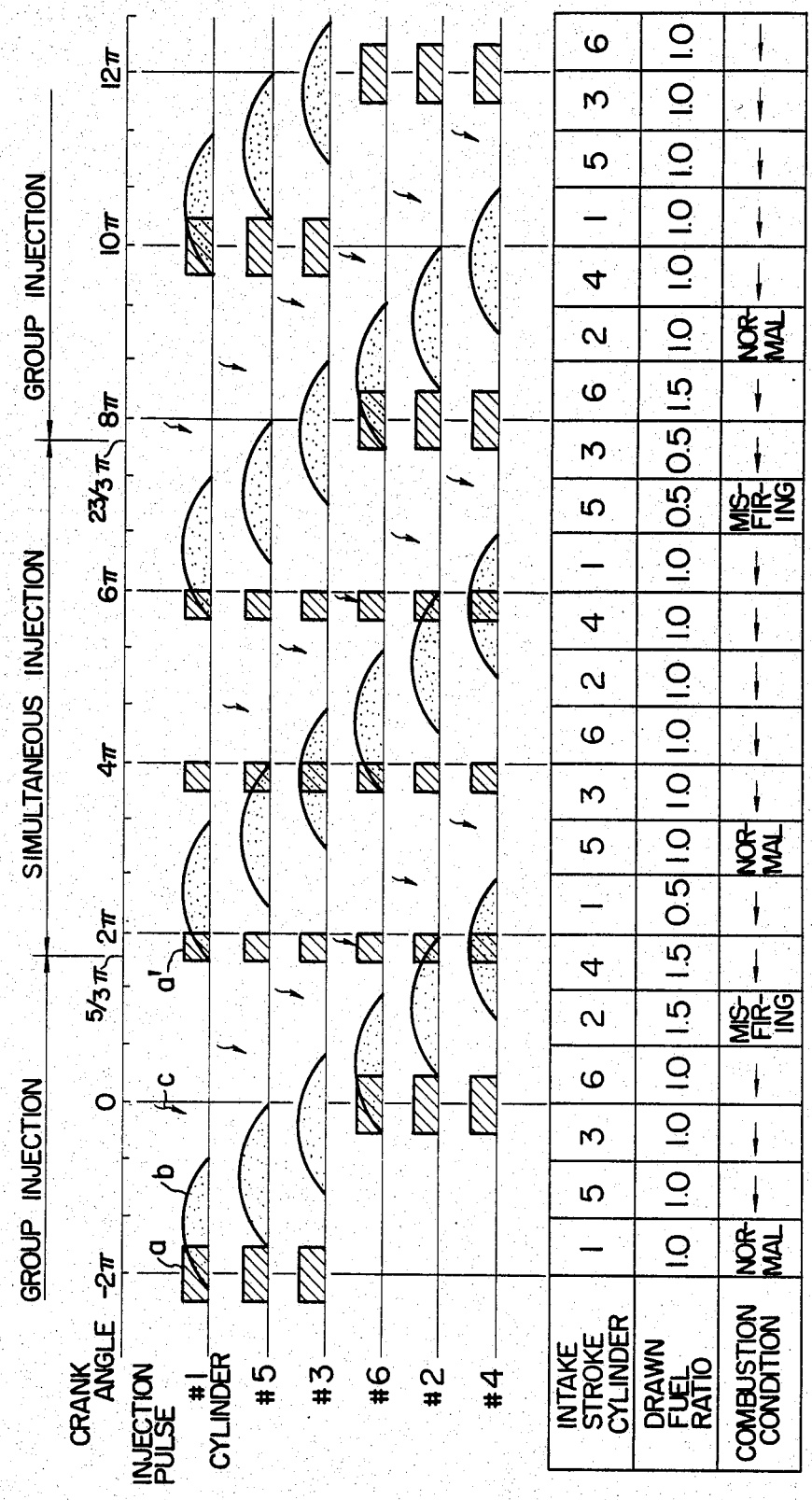

Next, the manner in which the fuel is supplied during the change-over between the group injection mode and the simultaneous injection mode will be described with reference to FIG. 3. In the Figure also showing the case of a six-cylinder engine, the injection mode is changed over from the group injection to the simultaneous injection at the crank angle 5/3 $\pi$ and from the simultaneous injection to the group injection at the crank angle 23/3$\pi$, respectively. Since the simultaneous injection takes place once every revolution of the crankshaft, each injection pulse a' injects the fuel in an amount about ½ times that injected in the group injection mode, that is, one half the fuel amount required for each cycle is injected for every crankshaft revolution. Thus, considering in conjunction with the times of opening of the intake valves, as shown in the Figure, the Nos. 2 and 4 cylinders each receives a 50% richer fuel and the No. 1 cylinder receives a 50% leaner fuel during the group-to-simultaneous change-over, while the fuel is similarly supplied excessively and insufficiently during the simultaneous-to-group change-over, thus increasing the possibility of misfiring.

Figure 4:
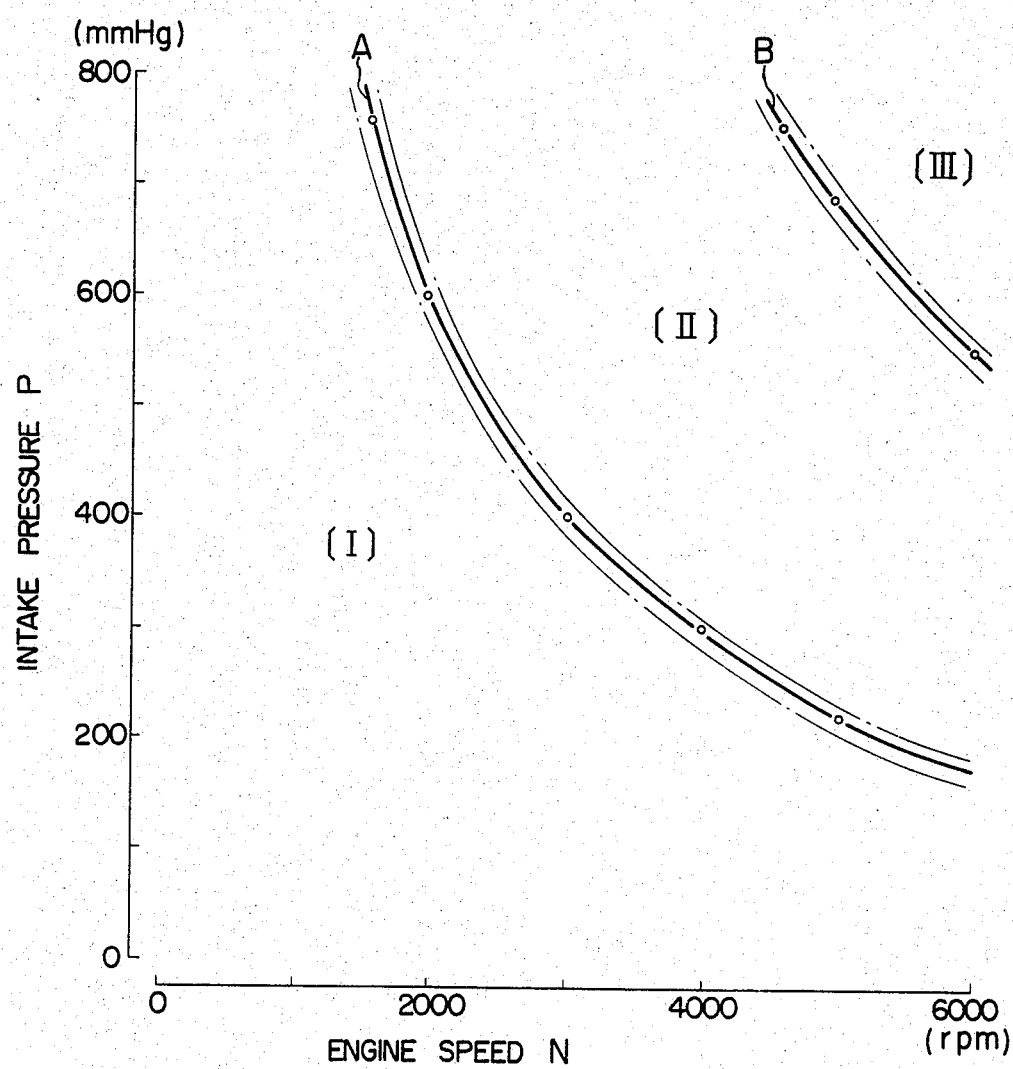
FIG. 4 is a characteristic diagram showing the load regions corresponding to the injection modes.

Next, the engine operating regions where the respective injection modes can be performed will be described. For instance, in order to simplify the required program processing and circuit construction, the injection for each cylinder is made to start after the end of the injection for the preceding cylinder in the case of the independent injection and the injection for one group is started after the end of the injection for the other group in the case of the group injection so as to avoid overlapping in the control of the injection pulse width. Where this control is to be used with a six-cylinder engine, a limit injection period (or maximum injection period) for each cylinder is 720/6=120° CA (crank angle degrees) time in the case of the independent injection and it becomes 720/2=360° CA time in the case of the two-group injection. Considering the case of a six-cylinder 2-liter engine, as shown in FIG. 4, by changing over the independent injection mode to the group injection mode, the region of adverse effect on the drivability moves from a line A to a line B thus substantially presenting no problem from the practical point of view. In the Figure, the line A indicates an independent injection limit region (boundary value) and the line B indicates a group injection limit region (boundary values).

Figure 5:
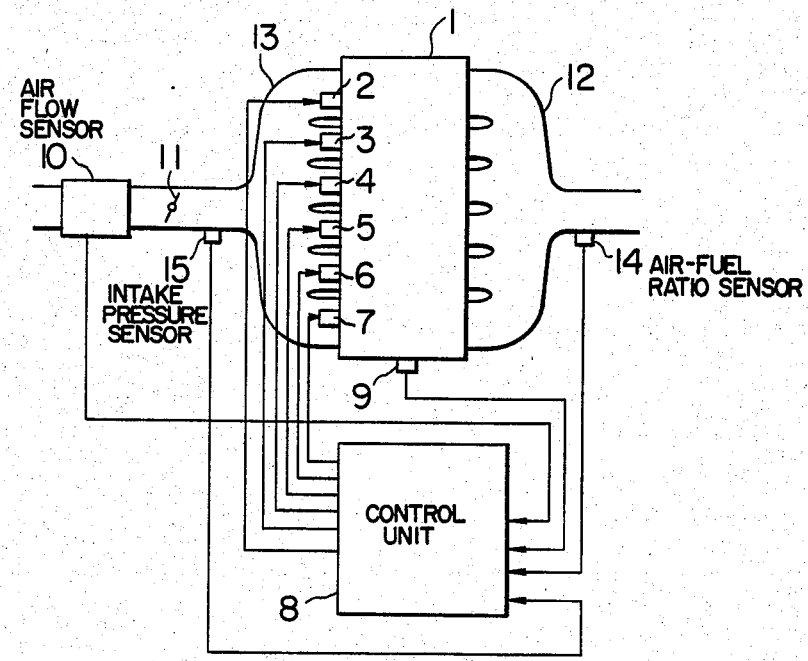
FIG. 5 is a schematic diagram showing the construction of an embodiment of a fuel injection control apparatus according to the invention.

FIG. 5 is a schematic diagram showing the construction of a system for realizing the invention. Numeral 1 designates an internal combustion engine, 2 to 7 fuel injectors, and 8 a control unit for controlling the opening and closing of the fuel injectors 2 to 7 so as to control the amount and timing of fuel injection. The control unit 8 receives various signals indicative of the intake air amount, intake air temperature, engine temperature, engine speed, injection timing, etc., as in the case of a conventional electronically controlled fuel injection system. The control unit 8 includes a microcomputer which is responsive to the input signals to compute the required fuel quantity of the engine and compute the time period required for injecting the required fuel quantity. Numeral 9 designates a crank angle sensor, 10 an air flow sensor, 11 a throttle valve, 12 an exhaust manifold, 13 an intake manifold, 14 an air-fuel ratio sensor for sensing the composition of exhaust gases, and 15 an intake pressure sensor.

Figure 6:
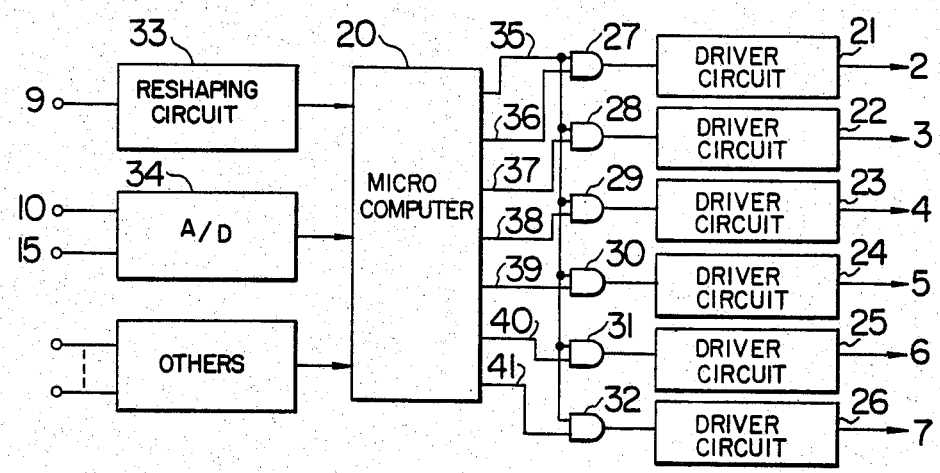
FIG. 6 is a detailed block diagram of the control apparatus shown in FIG. 5.

FIG. 6 is a detailed block diagram of the control unit 8 shown in FIG. 5. Numeral 20 designates the microcomputer, Numeral 33 designates a reshaping circuit for reshaping the waveform of a crank angle signal, and 34 an A/D converter. The signal from the crank angle sensor 9 is applied to the computer 20 through the reshaping circuit 33. Also, the voltage signals from the air flow sensor 10 and the intake pressure sensor 15 are converted to digital signals by the A/D converter 34 and then applied to the computer 20. In accordance with these input signals, the computer 20 determines the desired fuel injection mode (injection timing) and injection time period so that an injection time signal is generated from an I/O port 35, and I/O ports 36 to 41 designate the proper cylinders for fuel injection. These injection time signals are respectively applied to injector driver circuits 21 to 26 through AND circuits 27 to 32.

Referring to FIGS. 7A and 7B, there are illustrated flow charts for explaining the operation of the principal parts of the computer 20 including a microcomputer. In the flow chart of FIG. 7A showing a main routine, after initialization in a step 100, the signals indicative of the engine parameters, such as, the intake air amount, intake pressure, engine speed, engine temperature, throttle opening, exhaust temperature, intake air temperature, etc., are inputted in a step 101 and the necessary computational operations on the signals (e.g., the operations of averaging the intake negative pressure signal and computing the engine speed) are performed in the next step 102. Also, a step 103 performs the necessary computational operations on other controlled systems than the fuel injection control (e.g., the control of idle speed and the control of exhaust recirculation amount) as needed. The steps 101 to 103 are always performed in the main routine so that if an interrupt instruction is generated as shown in FIG. 7B, an interrupt routine is immediately executed preferentially.

FIG. 7B shows a processing chart for changing the quantity of fuel injected and the mode of fuel injection in accordance with the operating conditions of the engine. When the fuel injection processing routine is started by a crank angle interrupt the intake air quantity Q, the engine speed N, the intake pressure P, etc., are read out in a step 201 and the fuel injection time period T corresponding to the required fuel quantity K·Q/N per engine intake stroke (where K is the correction factor) is computed in a step 202.

Then, in this embodiment the operating condition of the engine is determined in accordance with the intake pressure P and the engine speed N, that is, a step 203 determines whether the engine is presently in any of the load regions [I], [II] and [III] shown in FIG. 4. This decision method may be such that the boundary values indicative of the boundary conditions A and B of the load regions [I], [II] and [III] are stored in the memory included in the computer 20 and the current intake pressure P is compared with the boundary values of intake pressures on the lines A and B at the given engine speed N thereby determining that load region in which the engine is presently operating.

In order to prevent the fuel injection mode from being changed and deteriorating the drivability due to a slight speed change or pressure change when the engine is operating stably in the neighborhood of any boundary value, the boundary values may be provided with a hysteresis range as shown by the dot-and-dash lines along the lines A and B in FIG. 4.

Then, when the step 203 determines that the engine is in the load region [I] (a so-called low load region), a step 204 determines whether the desired independent injection timing is reached as shown in FIG. 2 so that if it is, a step 205 performs an independent injection processing and the fuel is injected once per intake stroke into each of the cylinders independently. If it is not in the independent injection timing, the injection is not effected. If it is determined that the engine is in the load region [II] (a so-called intermediate load region), a step 206 determines whether the desired injection timing is reached as shown in FIGS. 2 and 3 so that if it is, a step 207 performs a group injection processing such that the injection is effected once per intake stroke separately for each of the two groups (the group of the Nos. 1, 5 and 3 cylinders and the group of the Nos. 6, 2 and 4 cylinders). Similarly, when it is determined that the engine is in the load region [III] (a so-called high load region), if the desired injection timing is reached as shown in FIG. 3, a step 209 performs a simultaneous injection processing so that two simultaneous injections each representing one half the usual quantity are performed per intake stroke.

The operation of the fuel injectors 2 to 7 according to each of the injection modes can be effected easily by selecting one of the injection cylinder operating sequences (logics) stored in the memory of the computer 20 in accordance with each injection mode such that in accordance with the selected sequence, selection logic signals are applied to the I/O ports 36 to 41, and then the AND circuits 27 to 32 perform the decision of coincidence thereby effecting the injection of fuel into the respective cylinders.

Also, with each of the injection modes, the determination of the desired injection timing can be made by detecting a given crank angle position in accordance with the signal from the crank angle sensor 9.

While the computation of fuel injection is performed in the interrupt routine, it is possible to effect this computation in the main routine at all times.

Further, in addition to the previously mentioned method, it is possible to use any other engine load condition determining method which detects and utilizes a factor relating to the load condition of the engine, such as, the fuel injection time, a discrimination signal from outside the sensors (e.g., a throttle position signal) or the intake air amount.

Still further, a feedback correction amount based on a signal from the air-fuel ratio sensor 14 may be taken into account in the computation of a fuel injection time period, and also in the independent injection mode the variations in air-fuel ratio among the cylinders may be detected by the air-fuel ratio sensor 14 so as to compute a different fuel injection time period for each of the cylinders.

From the foregoing description it will be seen that in accordance with the above-described embodiment the load condition (or the operating condition) of an engine is determined in a two-dimensional region in accordance with two parameters, e.g., the engine speed N and the intake pressure P thus determining the load condition with greater accuracy and also the injection method is divided into three phases of independent, group and simultaneous injections thereby accomplishing the independent injection having an improved transient response in the low speed and load region without deteriorating the drivability and the exhaust purifying characteristic.

We claim:

1. A method for controlling fuel injeciton in a multi-cylinder internal combustion engine having an independently operable fuel injector for each cylinder, comprising the steps of:
    detecting a load condition of said engine in accordance with an engine operating parameter;
    determining to which of predefined low, intermediate or high load condition regions the detected load condition belongs;
    in the event the detected load is the low load region, injecting fuel according to a first fuel injection mode wherein each of said fuel injectors is driven independently at optimum crank angle timing for each cylinder;
    in the event the detected load is in the intermediate load region, injecting fuel according to a second fuel injection mode wherein said cylinders are grouped and each group driven collectively in turn at a predetermined crank angle timing;
    in the event the detected load is in the high load region, injecting fuel according to a third fuel injection mode wherein said fuel injectors are driven simultaneously at a predetermined crank angle timing,
    changes between injecting modes being made sequentially and continually depending on changes in said detected load condition of said engine.

2. A method according to claim 1, wherein said predefined regions include an amount of hysteresis to facilitate said continual changes between said modes.

3. A fuel injection control apparatus for a multi-cylinder internal combustion engine having a fuel injector for each cylinder, comprising:
    sensor means for generating a signal indicative of a load condition of said engine;
    determination means, responsive to said sensor means signal, for determining that said engine is operating in one of a high load region;
    fuel injector drive means for independently controlling each of said fuel injector to inject fuel at selected crank angle timing; and
    control means for controlling said fuel injector drive means in one of three fuel injection modes, which three modes are uniquely associated with the three potential load regions determined by said determination means,
    wherein a first mode associated with said low load region includes individually driving each of said fuel injectors at a crank angle timing optimum for each said cylinder, a second mode associated with said intermediate load region includes dividing all of said cylinders into a plurality of groups with each group being driven collectively in turn at a predetermined crank angle timing a third mode associated with said high load region includes simultaneously driving all of said fuel injector at a predetermined crank angle timing.

4. An apparatus as in claim 3, wherein said determination means includes a hysteresis means for establishing hysteresis effect for each of said regions to facilitate smooth transition in said determination of said regions.

* * * * *